US009052542B2

(12) United States Patent
Lee et al.

(10) Patent No.: US 9,052,542 B2
(45) Date of Patent: Jun. 9, 2015

(54) LIGHT SOURCE PACKAGE AND BACKLIGHT UNIT INCLUDING THE LIGHT SOURCE PACKAGE

(75) Inventors: Young-Keun Lee, Cheonan-si (KR); Yong Kyu Kang, Yongin-si (KR); Joong Hyun Kim, Asan-si (KR); Sang-Chul Byun, Anyang-si (KR); Ju Youn Son, Asan-si (KR)

(73) Assignee: Samsung Display Co., Ltd. (KR)

( * ) Notice: Subject to any disclaimer, the term of this patent is extended or adjusted under 35 U.S.C. 154(b) by 310 days.

(21) Appl. No.: 13/571,140

(22) Filed: Aug. 9, 2012

(65) Prior Publication Data

US 2013/0215600 A1 Aug. 22, 2013

(30) Foreign Application Priority Data

Feb. 17, 2012 (KR) ........................ 10-2012-0016453

(51) Int. Cl.
  *G09F 13/04* (2006.01)
  *F21V 13/02* (2006.01)
  *G02F 1/1335* (2006.01)

(52) U.S. Cl.
  CPC .... *G02F 1/133603* (2013.01); *G02F 1/133605* (2013.01); *G02F 2001/133607* (2013.01)

(58) Field of Classification Search
  None
  See application file for complete search history.

(56) References Cited

U.S. PATENT DOCUMENTS 7,296,913 B2 * 11/2007 Catalano et al. ............. 362/257
7,352,011 B2   4/2008 Smits et al.
7,901,113 B2   3/2011 Kim et al.
2007/0201241 A1 * 8/2007 Komatsu ....................... 362/545
2007/0236953 A1 * 10/2007 Nakazawa et al. ............ 362/544
2008/0084699 A1 * 4/2008 Park et al. ..................... 362/373
2009/0268469 A1   10/2009 Huang et al.
2010/0277948 A1   11/2010 Park et al.
2010/0290208 A1 * 11/2010 Pickard .......................... 362/84
2010/0290242 A1 * 11/2010 Fischer et al. ................ 362/520
2012/0155084 A1 * 6/2012 Hsueh et al. ............. 362/249.01

FOREIGN PATENT DOCUMENTS

| EP | 2 290 712 | 3/2011 |
|---|---|---|
| JP | 2006286907 | 10/2006 |
| JP | 2007005791 | 1/2007 |
| JP | 2010245295 | 10/2010 |
| JP | 2011003460 | 1/2011 |
| JP | 2011009052 | 1/2011 |
| KR | 1020060040502 | 5/2006 |
| KR | 1020060113246 | 11/2006 |
| KR | 100692432 | 3/2007 |
| KR | 100722590 | 5/2007 |

(Continued)

*Primary Examiner* — Ashok Patel
(74) *Attorney, Agent, or Firm* — Innovation Counsel LLP

(57) ABSTRACT

A light source package includes a first light source configured to emit first light, an imaginary central axis of the first light extending in a first direction. The light source package may further include a second light source configured to emit second light, an imaginary central axis of the second light extending in a second direction that is different from the first direction. The light source package may further include a first optical part including a first surface that is configured to reflect at least a first portion of the first light. The light source package may further include a second optical part configured to spread the second light. The light source package may advantageously enable illuminating a desirably large display area with a minimum number of light sources and/or optical parts.

13 Claims, 11 Drawing Sheets

(56) References Cited

FOREIGN PATENT DOCUMENTS

| KR | 1020070117689 | 12/2007 |
| KR | 1020110043863 | 4/2011 |
| KR | 1020110043864 | 4/2011 |

* cited by examiner (A)

(B)

(C)

(A)

(B)

LIGHT SOURCE PACKAGE AND BACKLIGHT UNIT INCLUDING THE LIGHT SOURCE PACKAGE

CROSS-REFERENCE TO RELATED APPLICATION

This application claims priority to and the benefit of Korean Patent Application No. 10-2012-0016453 filed in the Korean Intellectual Property Office on Feb. 17, 2012, the entire contents of which are incorporated herein by reference.

BACKGROUND OF THE INVENTION (a) Field of the Invention

The present invention relates to a light source package and a backlight unit including the light source package.

(b) Description of the Related Art

Flat panel display devices may be classified into self-light-emitting display devices, which may emit light to display images, and passive (non-emissive) display devices, which may require one or more light sources. Self-light-emitting display devices may include light emitting diode (LED) display devices, field emissive display (FED) devices, vacuum fluorescent display (VFD) devices, and plasma display panel (PDP) devices. Passive (non-emissive) display devices may include liquid crystal display (LCD) devices and electrophoretic display devices.

A passive display device, such as a transmissive type display device, may include a display panel for displaying an image and a backlight unit for supplying light to the display panel. The backlight unit may include a light source package that includes at least one light source for generating light. The light source may include, for example, one or more of a cold cathode fluorescent lamp (CCFL), a flat fluorescent lamp (FFL), and a light emitting diode (LED). Recently, light emitting diodes, which may require relatively low power consumption and may generate a relatively small amount of heat, have been widely used as light sources for display devices.

The backlight unit should substantially uniformly irradiate light to a rear surface of the display panel. The backlight unit may be a direct type backlight unit or an edge type backlight unit, according to the position of the light source in the backlight unit.

A direct type backlight unit may include a light source that directly irradiates light to a display panel. In the direct type backlight unit, an optical lens may be used to refract the light emitted from the light source such that the light is widely spread.

In an edge type backlight unit, one or more light sources may be disposed at one side or both sides of a light guide, and light may be diffused through the light guide and indirectly irradiated to a display panel.

To reduce manufacturing cost of the backlight unit, it is preferable to reduce the number of the light sources and/or the optical parts included in the backlight unit. Nevertheless, given a limited number of light sources and/or optical parts, the beam spread angles of the light sources may be insufficient to ensure uniformity of the irradiated light.

The above information disclosed in this Background section is only for enhancement of understanding of the background of the invention; therefore, it may contain information that does not form the prior art that is already known in this country to a person of ordinary skill in the art.

SUMMARY OF THE INVENTION

One or more embodiments of the invention may be related to a light source package that may include a first light source configured to emit first light, an imaginary central axis of the first light extending in a first direction. The light source package may further include a second light source configured to emit second light, an imaginary central axis of the second light extending in a second direction that is different from the first direction. The light source package may further include a first optical part including a first surface that is configured to reflect at least a first portion of the first light. The light source package may further include a second optical part configured to spread the second light.

The light source package may enable illuminating a desirably large display area with a minimum number of light sources and/or optical parts. Advantageously, the manufacturing cost of the light source package may be minimized, and the manufacturing cost of the backlight unit and the associated display device also may be minimized.

In one or more embodiments, the light source package may further include a reflecting sheet that reflects the first light reflected by the first surface of the first optical part. The light source package may further include a diffusion sheet disposed over the first and second light sources. The first light reflected by the reflecting sheet may be directed toward the diffusion sheet. The second light spread by the second optical part may be directed toward the diffusion sheet.

In one or more embodiments, the second optical part may overlap the second light source.

In one or more embodiments, an outer surface of the second optical part may include a groove in a substantially central region of the outer surface, and the second light source may be located below and aligned with the groove.

In one or more embodiments, a distance from an inner surface to the outer surface of the second optical part above the second light source may be shortest.

In one or more embodiments, the first surface may be concave.

In one or more embodiments, the first light source may be positioned between the first optical part and the second optical part.

In one or more embodiments, the second optical part may include a second concave surface that is configured to reflect at least a second portion of the first light.

In one or more embodiments, the second concave surface may be convex toward the second light source.

In one or more embodiments, the first concave surface may extend longer than the second concave surface.

In one or more embodiments, the light source package may further include a heat transfer unit thermally coupled with the first light source and surrounded by the first optical part.

In one or more embodiments, the first optical part may appear larger than the second optical part in a top view of the light source package.

In one or more embodiments, the first optical part may include at least one of a resin portion and a metal portion.

In one or more embodiments, the first light source and the second light source may be electrically connected in series.

One or more embodiments of the invention may be related to a backlight unit that may include a diffusion sheet and a reflecting sheet spaced from the diffusion sheet. The backlight unit may further include a case. The backlight unit may further include a light source package disposed in the case. The light source package may include a first light source configured to emit first light. The light source package may further include a second light source configured to emit second light toward the diffusion sheet. The light source package may further include a first optical part including a first concave surface that is configured to reflect at least a first portion of the first light to the reflecting sheet. The light source package may further include a second optical part overlapping the second light source and configured to spread the second light. The first light source may be positioned between the first optical part and the second optical part.

In one or more embodiments, the second optical part may include a second concave surface that is configured to reflect at least a second portion of the first light to the reflecting sheet.

In one or more embodiments, the reflecting sheet may be configured to reflect the second portion of the first light to the diffusion sheet.

In one or more embodiments, the second concave surface may be concave with respect to the reflecting sheet.

In one or more embodiments, the first concave surface may extend longer than the second concave surface.

In one or more embodiments, the reflecting sheet may be configured to reflect the first portion of the first light to the diffusion sheet.

In one or more embodiments, the backlight unit may further include a heat transfer unit thermally coupled with the first light source and surrounded by the first optical part.

In one or more embodiments, the backlight unit may further include a heat transfer unit thermally coupled with the first light source and thermally coupled between the first optical part and the case.

In one or more embodiments, the first optical part may appear larger than the second optical part in a top view of the light source package.

In one or more embodiments, the first optical part may include at least one of a resin portion and a metal portion.

In one or more embodiments, the first light source and the second light source may be electrically connected in series.

In one or more embodiments, the first optical part may directly contact the case and is thermally coupled with the case.

One or more embodiments of the invention may be related to a light source package that may include a first light source for emitting first light and a second light source for emitting second light, wherein an imaginary central axis of the first light extends in a first direction, and wherein an imaginary central axis of the second light extends in a second direction that is different from the first direction. The light source package may further include a first optical part having a first concave surface that is configured to reflect at least a first portion of the first light. The light source package may further include a second optical part overlapping the second light source for spreading the second light. The first light source may be positioned between the first optical part and the second optical part.

The first light source may represent a side light source of the light source package. The light source package may include a plurality of side light sources. The one or more side light sources may be attached to a printed circuit board (PCB) that is disposed between the first optical part and the second optical part. The second light source may represent an upper light source of the light source package. The light source package may include a plurality of upper light sources. The one or more upper light sources may be attached to a printed circuit board (PCB) that is disposed above the first optical part.

One or more embodiments of the invention may be related to a backlight unit that includes the light source package. The backlight unit may further include a diffusion sheet, a reflecting sheet spaced from the diffusion sheet, and a case for accommodating the light source package.

The light source package may enable illuminating a desirably large display area with a minimum number of light sources and/or optical parts. Advantageously, the manufacturing cost of the light source package may be minimized, and the manufacturing cost of the backlight unit and the associated display device also may be minimized.

In one or more embodiments, the second optical part may include a second concave surface that is configured to reflect at least a second portion of the first light to the reflecting sheet.

In one or more embodiments, the reflecting sheet may be configured to reflect the second portion of the first light to the diffusion sheet.

In one or more embodiments, the second concave surface may be convex toward the second light source.

In one or more embodiments, the second concave surface may be concave with respect to the reflecting sheet In one or more embodiments, the first concave surface may extend longer than the second concave surface.

In one or more embodiments, the reflecting sheet may be configured to reflect the first portion of the first light to the diffusion sheet.

In one or more embodiments, the light source package and/or the backlight unit may include a heat transfer unit thermally coupled with the first light source and surrounded by the first optical part.

In one or more embodiments, he light source package and/or the backlight unit may include a heat transfer unit thermally coupled with the first light source and thermally coupled between the first optical part and the case.

In one or more embodiments, the first optical part may appear larger than the second optical part in a top view of the light source package.

In one or more embodiments, the first optical part may include at least one of a resin portion and a metal portion. The resin portion may be made of one or more of polycarbonate (PC), polystyrene (PS), and polymethyl methacrylate (PMMA). The metal portion may be made of aluminum (Al). The second optical part may include a transparent portion made of one or more of polycarbonate (PC), polystyrene (PS), and polymethyl methacrylate (PMMA).

In one or more embodiments, the first light source and the second light source are electrically connected in series.

In one or more embodiments, the first light source may be implemented in a first circuit, and the second light source may be implemented in a second circuit that is electrically insulated from the first circuit.

In one or more embodiments, the first optical part directly contacts the case and is thermally coupled with the case.

According to one or more embodiments of the present invention, light may be substantially uniformly and comprehensively irradiated to a satisfactorily large display area of a display panel using a minimum number of light sources and/or optical parts. Advantageously, given a specified display area size, the manufacturing cost of light source packages, backlight units, and/or display devices may be substantially minimized.

DETAILED DESCRIPTION

Figure 1:
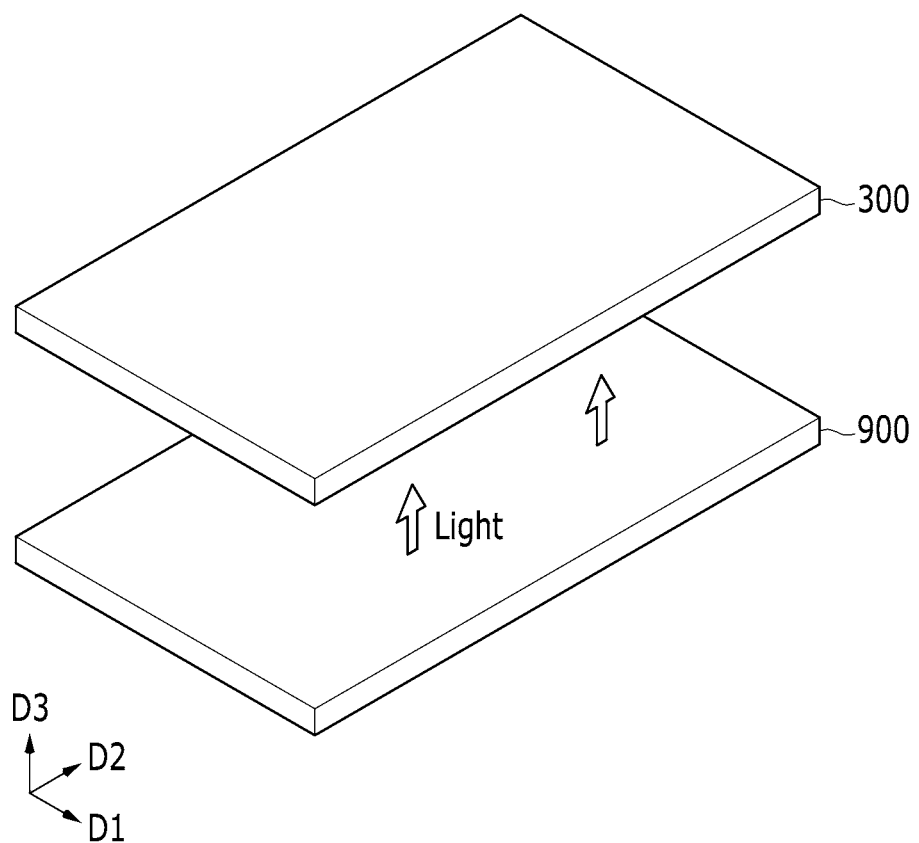
FIG. 1 illustrates an exploded perspective view of a display device according to an embodiment of the present invention.

The present invention will be described more fully hereinafter with reference to the accompanying drawings, in which embodiments of the invention are illustrated. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, referring to FIG. 1, a display device according to an embodiment of the present invention will be described.

FIG. 1 illustrates an exploded perspective view of a display device according to an embodiment of the present invention.

Referring to FIG. 1, a display device according to an embodiment of the present invention includes a display panel 300 and a backlight unit 900.

The display panel 300 may include a plurality of pixels (not illustrated) for displaying an image. The display panel 300 may further include a plurality of driving circuits for applying one or more driving signals to drive the plurality of pixels through a plurality of signal lines. In an embodiment, the display panel 300 may be a transmissive type display panel.

The backlight unit 900 is positioned at a rear surface of the display panel 300 and may substantially uniformly irradiate light to the display panel 300. Each of the display panel 300 and the backlight unit 900 may have an extending surface parallel to a surface defined by a first direction D1 and a second direction D2 perpendicular to the first direction D2, and the backlight unit 900 may emit the light in a third direction D3 perpendicular to each of the first direction D1 and the second direction D2.

Figure 2:
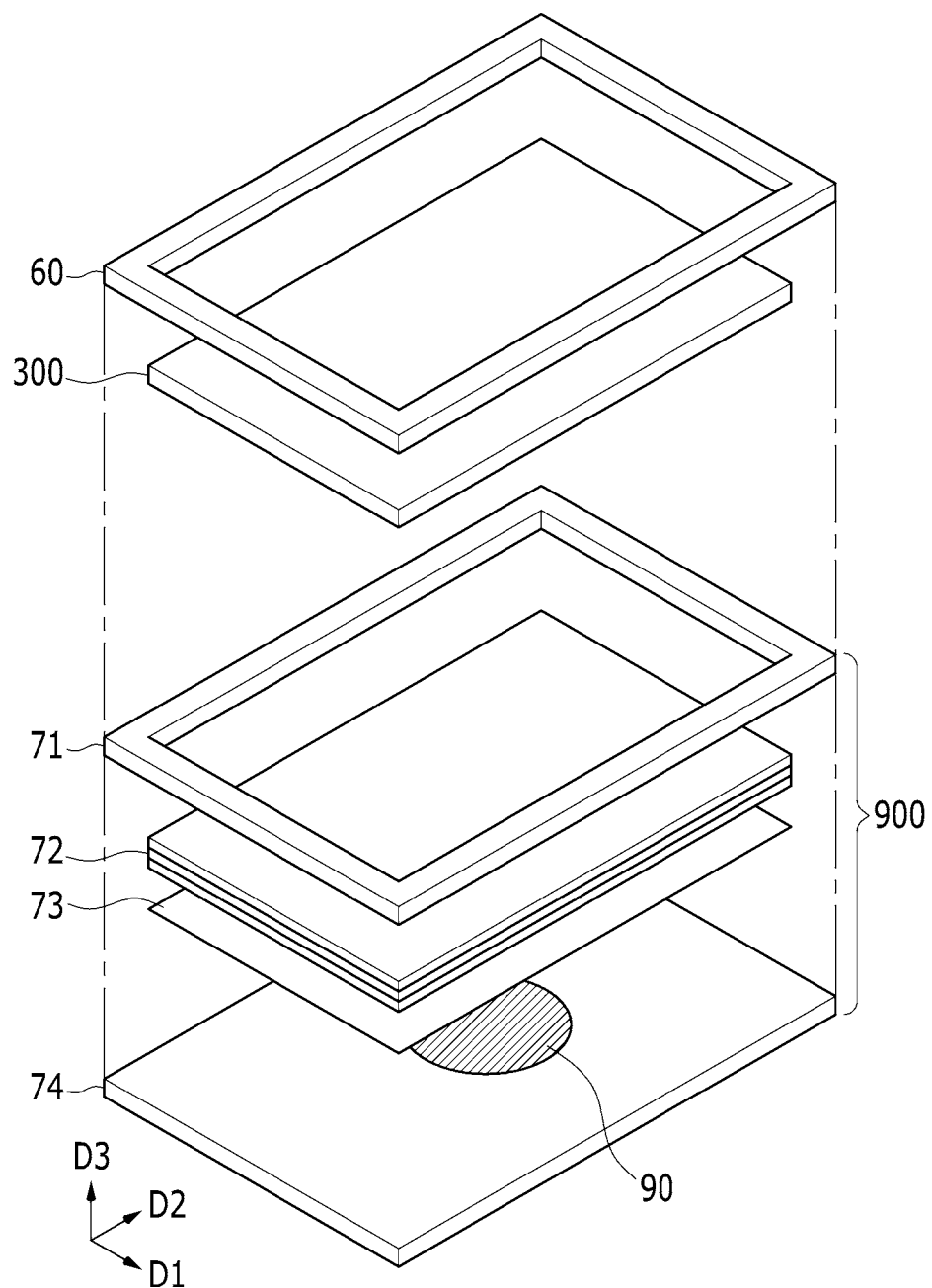
FIG. 2 illustrates an exploded perspective view of a display device according to an embodiment of the present invention.

FIG. 2 illustrates an exploded perspective view of the display device according to an embodiment of the present invention.

FIG. 2 illustrates a detailed example of the display device illustrated in FIG. 1. Nevertheless, the structure of the display device according to an exemplary embodiment of the present invention is not limited thereto, and a display device may include one or more different structures according to one or more embodiments of the present invention.

Referring to FIG. 2, a display device according to an embodiment of the present invention includes an upper frame 60, the display panel 300, and the backlight unit 900.

The display panel 300 is disposed and secured inside the upper frame 60. The upper frame 60 includes an opening for exposing a display area of the display panel 300.

Referring to FIG. 2, the backlight unit 900 may include a mold frame 71, an optical sheet 72, a diffusion sheet 73, a light source package 90, and a lower case (also referred to as a bottom chassis) 74.

The mold frame 71 may be coupled and fixed to the lower case 74. The mold frame 71, the lower case 74, or the combination of the mold frame 71 and the lower case 74 may contain the optical sheet 72, the diffusion sheet 73, and the light source package 90. The mold frame 71 may be omitted in one or more embodiments.

The diffusion sheet 73 is positioned on the light source package 90 to substantially uniformly diffuse the light incident from the light source package 90, thereby improving the uniformity of the luminance of the light. That is, the diffusion sheet 73 disperses the light incident from the light source package 90 for preventing the light from being locally concentrated.

The optical sheet 72 may include at least one optical sheet such as a prism sheet, thereby improving the luminance and the uniformity of the light. The optical sheet 72 may include a plurality of prism sheets and/or patterned sheets in one or more embodiments.

The light source package 90 includes at least three light sources (also referred to as light-emitting devices). An example of the light source may be a light emitting diode (LED); however, the present invention is not limited thereto.

The light source package 90 may be installed inside the lower case 74.

Next, the light source package 90 and the backlight unit 900 including the light source package 90 according to one or more embodiments of the present invention will be described with reference to FIG. 3, FIG. 4, FIG. 5, FIG. 6, FIG. 7, FIG. 8, and FIG. 9.

Figure 3:
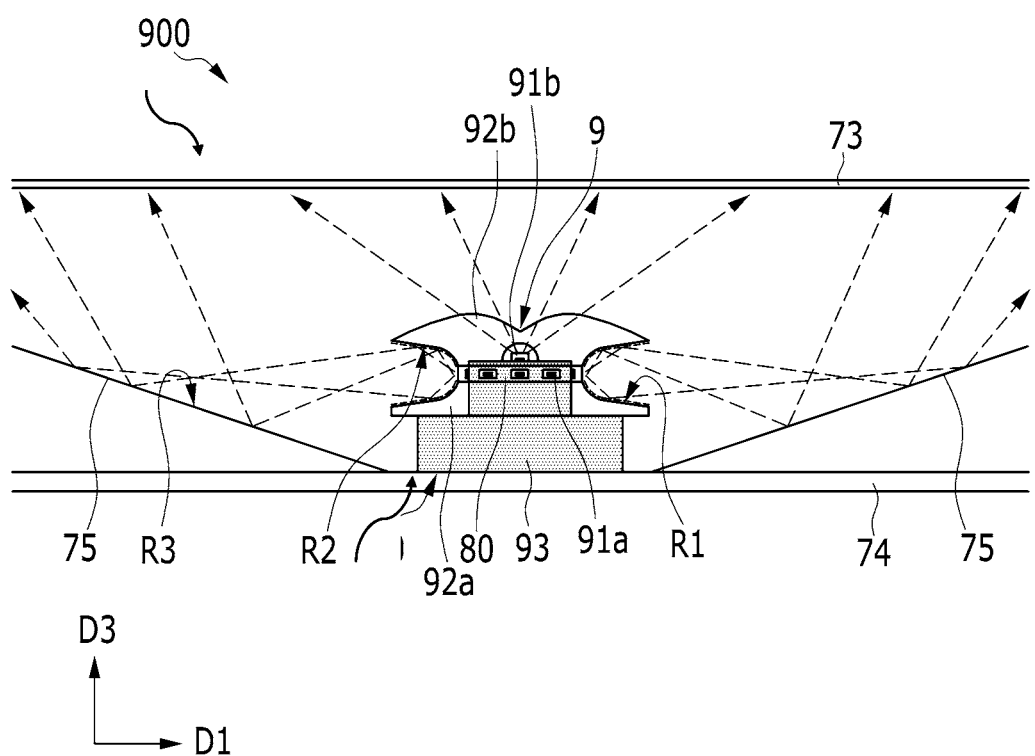
FIG. 3 illustrates a schematic partial side view of a backlight unit including a light source package according to an embodiment of the present invention.
Figure 4:
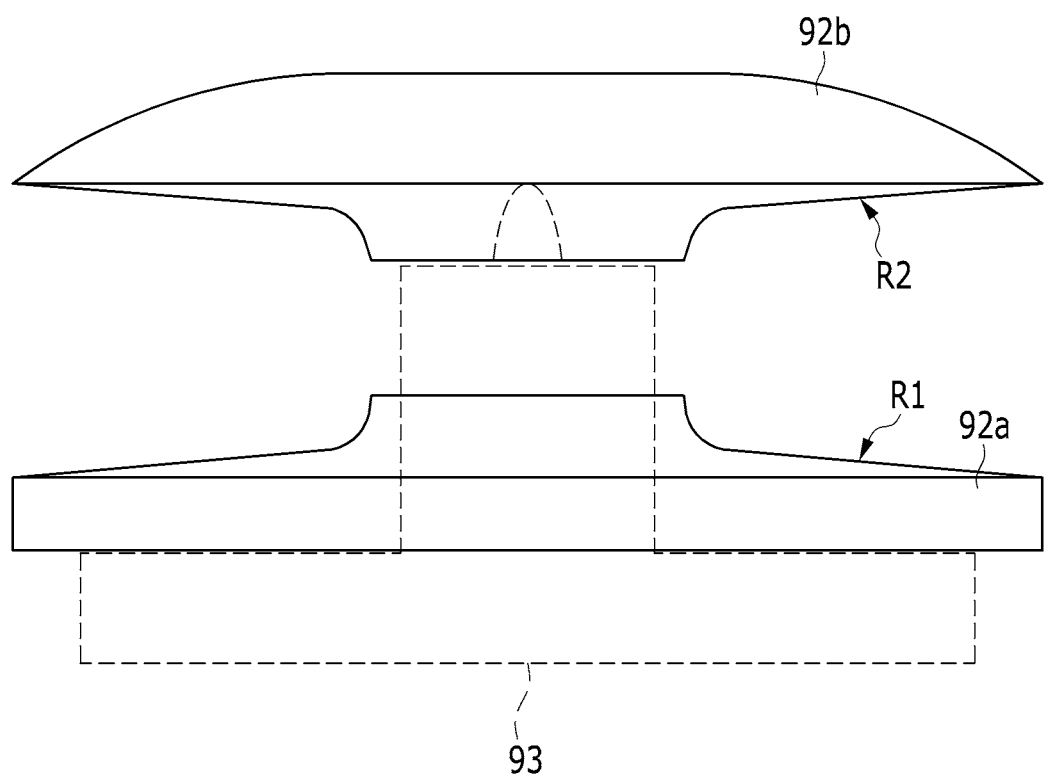
FIG. 4 illustrates a side view of an optical part of a light source package according to an embodiment of the present invention.
Figure 5:
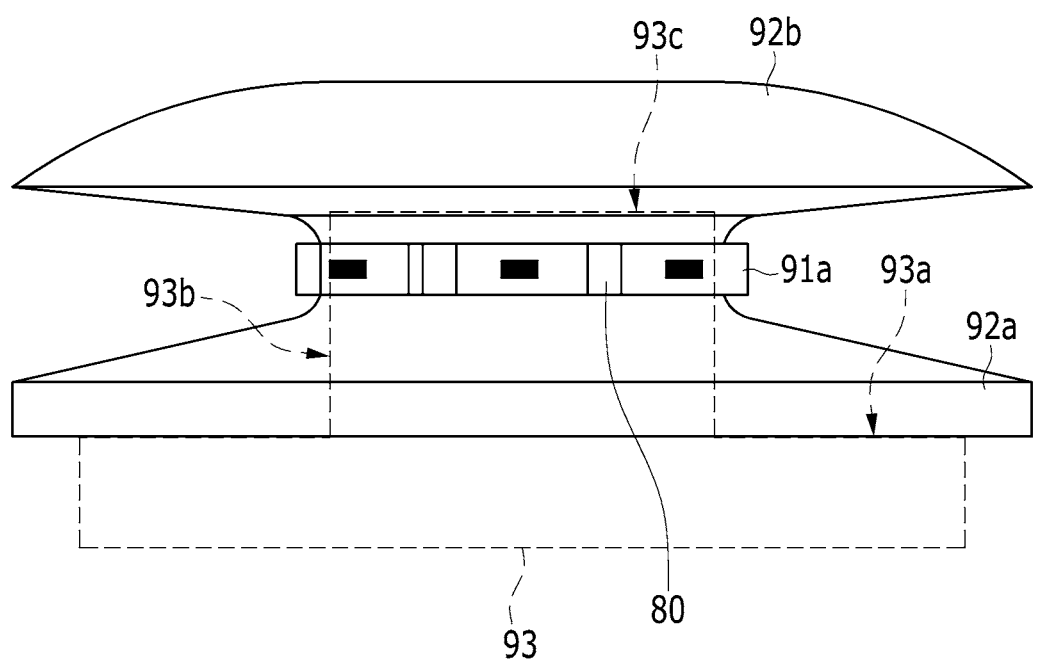
FIG. 5 illustrates a side view of a light source package according to an embodiment of the present invention.
Figure 6:
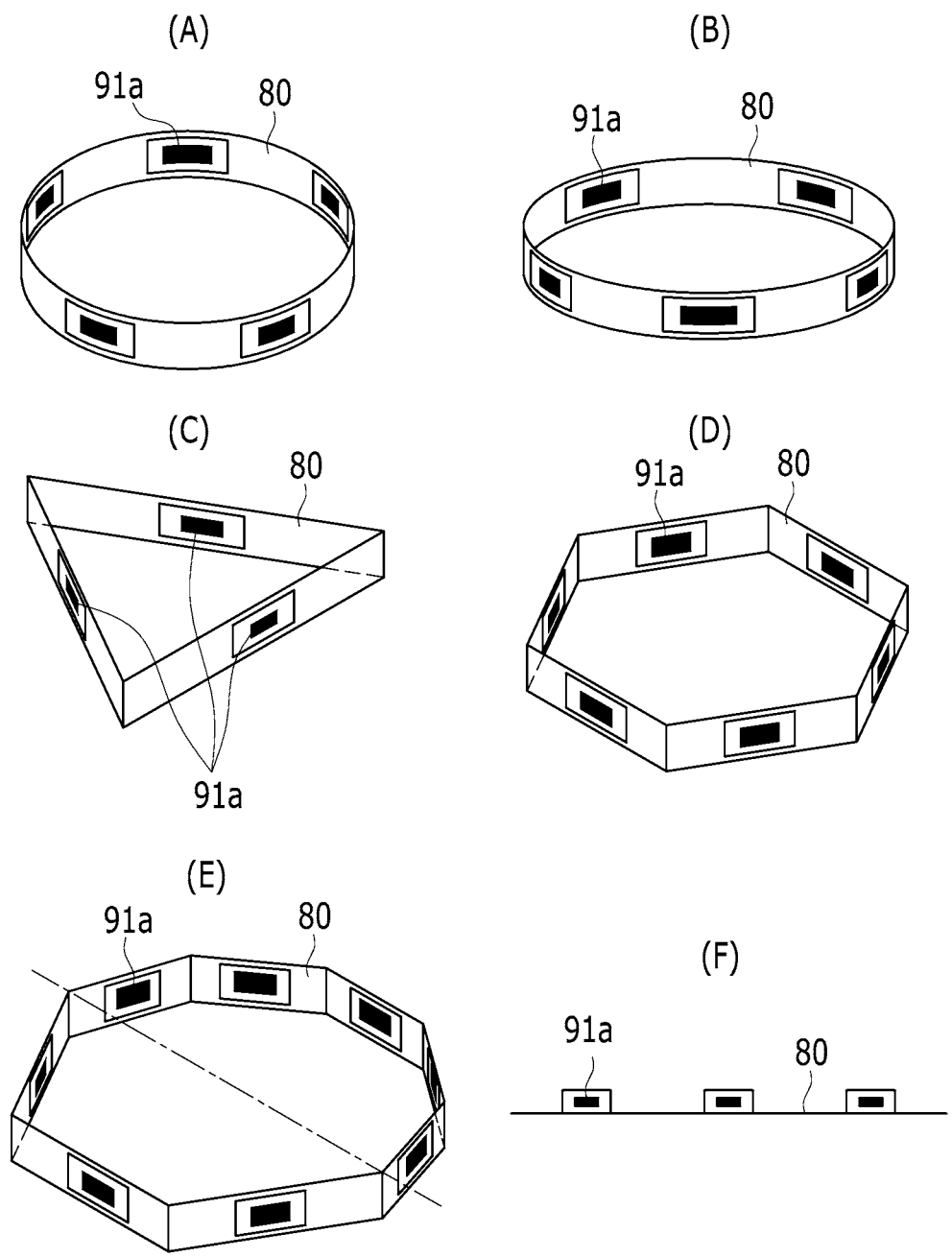
FIG. 6 illustrates perspective views of shapes of a light source and a printed circuit board (PCB) included in a light source package according to one or more embodiments of the present invention.
Figure 7:
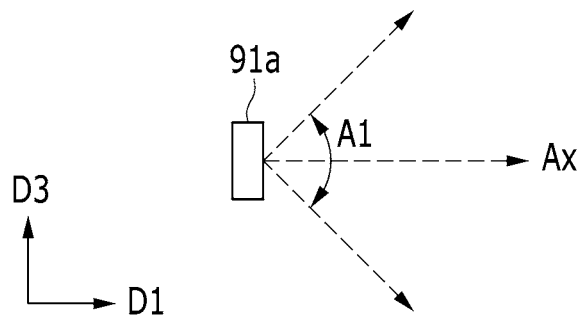
FIG. 7 illustrates views of examples of mounting a light source included in a light source package according to an embodiment of the present invention with several angles.
Figure 7:
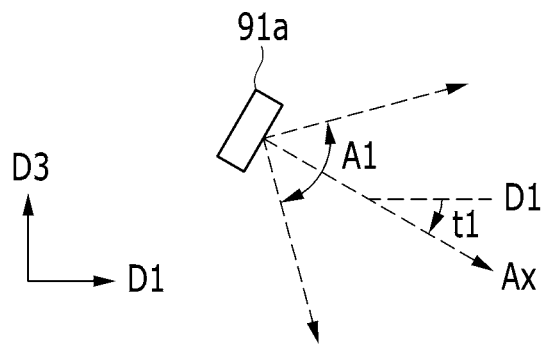
Figure 7:
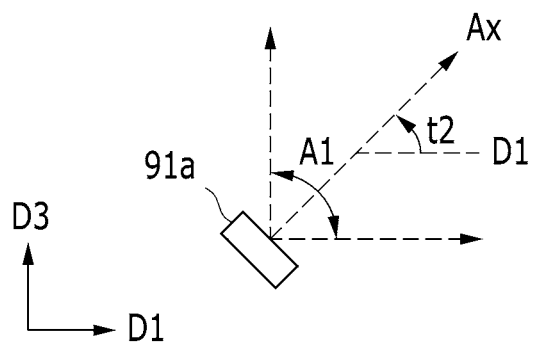
Figure 8:
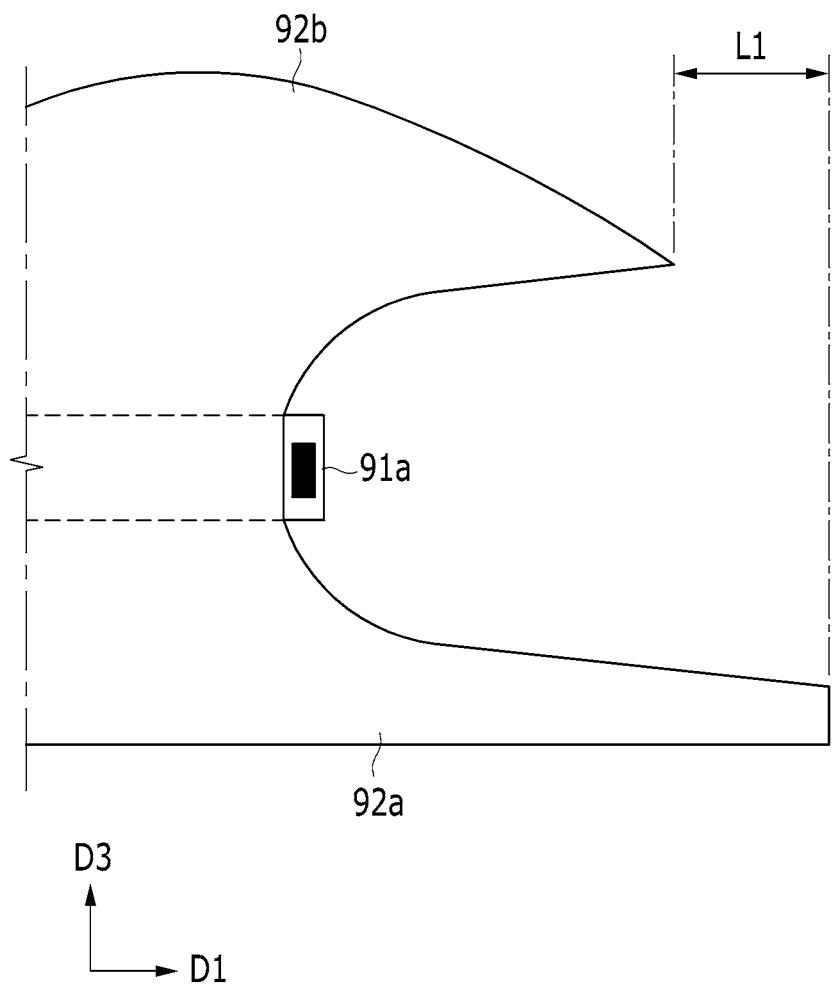
FIG. 8 illustrates a side view showing a shape of an optical part included in a light source package according to an embodiment of the present invention.
Figure 9:
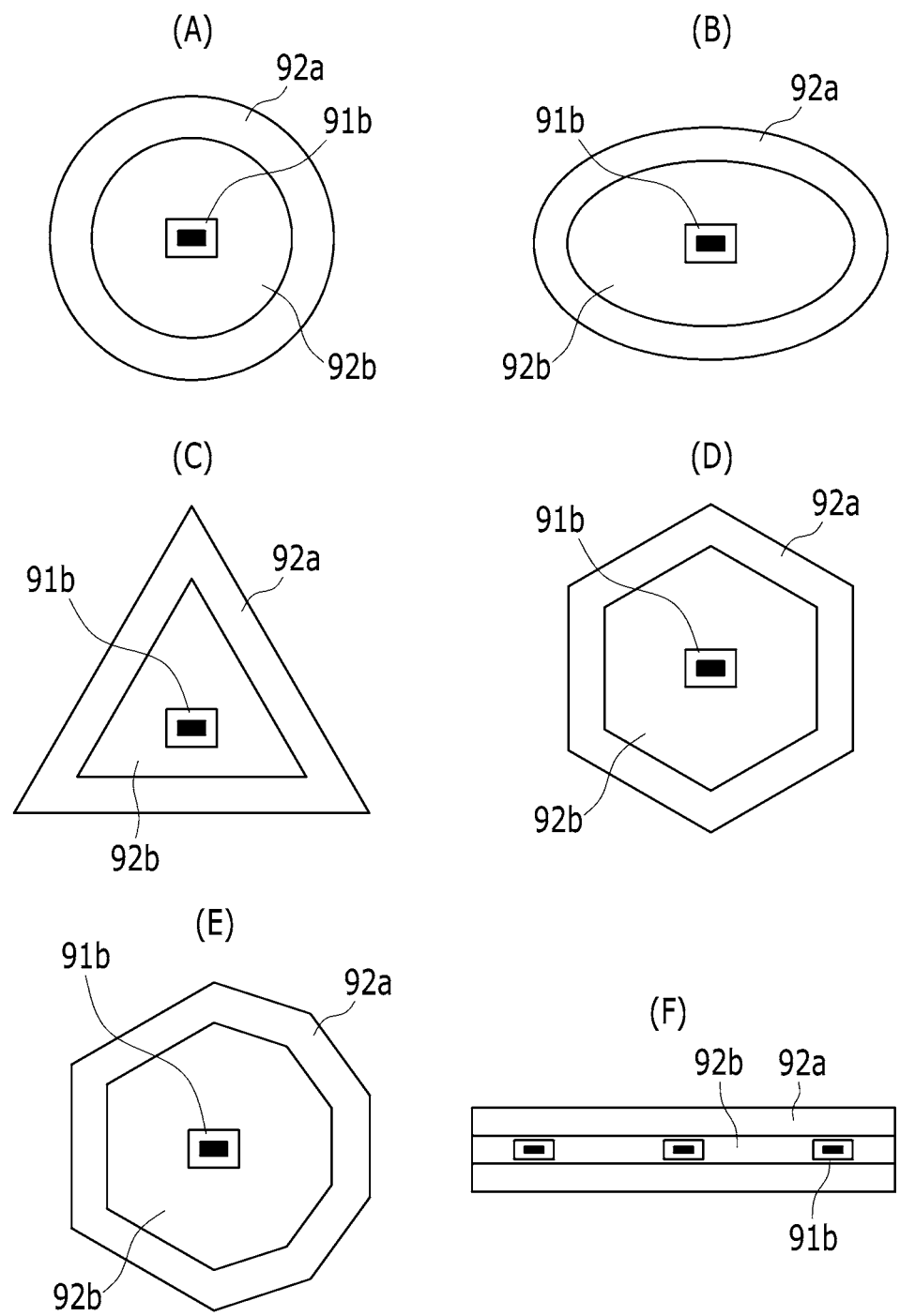
FIG. 9 illustrates top plan views of one or more embodiments of an optical part included in light source package according to an embodiment of the present invention.

FIG. 3 illustrated a schematic partial side view of a backlight unit 900 including a light source package 90 according to an embodiment of the present invention, FIG. 4 illustrates a side view of an optical part of a light source package according to an embodiment of the present invention, FIG. 5 is a side view of a light source package (90) according to an embodiment of the present invention, FIG. 6 illustrates perspective views of shapes of a light source and a printed circuit board (PCB) included in a light source package according to one or more embodiments of the present invention, FIG. 7 illustrates views of examples of mounting a light source included in a light source package according to an embodiment of the present invention with several angles, FIG. 8 illustrates a side view showing a shape of an optical part included in a light source package according to an embodiment of the present invention, and FIG. 9 illustrates top plan views of one or more embodiments of an optical part included in light source package according to an embodiment of the present invention.

Referring to FIG. 2, FIG. 3, FIG. 4, and FIG. 5, the backlight unit 900 according to an embodiment of the present invention may include a lower case 74, a reflecting sheet 75, at least one light source package 90, and a diffusion sheet 73 facing the light source package 90. The diffusion sheet 73 and the lower case 74 are described above with reference to FIG. 2.

The reflecting sheet 75 is positioned on the lower case 74, between the lower case 74 and the diffusion sheet 73, and includes a reflecting surface R3 for reflecting the light emitted from the light source package 90. The reflecting surface R3 may have an inclination angle with respect to the plane surface defined by the first direction D1 and the second direction D2, thereby reflecting the light emitted from the light source package 90 to side portions of the diffusion sheet 73, or portions of the diffusion sheet that do not overlap the light source package 90.

The light source package 90 may include at least two side light sources 91a, at least one upper light source 91b, and optical parts 92a and 92b.

The side light source 91a emits the light in at least a side direction with respect to the light source package 90. In one or more embodiments, the side direction may be a direction that is not parallel to the third direction D3. The light emitted from the side light source 91a is reflected at least once from the reflecting surface R3 of the reflecting sheet 75, thereby being incident to the diffusion sheet 73 upward.

One light source package 90 may include at least one printed circuit board (PCB) 80, and the side light source 91a is attached to the printed circuit board (PCB) 80 thereby being mounted in the light source package 90. The printed circuit board (PCB) 80 attached to the side light source 91a may be flexible.

Referring to FIG. 6, the printed circuit board (PCB) 80 according to an embodiment of the present invention may be formed, curved, and/or bent with at least one of various ring shapes or band shapes enclosing a space. The printed circuit board (PCB) 80 may have a cross section with a shape of at least one of a circle, an oval, a symmetrical polygon, and an asymmetrical polygon.

As illustrated in (A) and (B) of FIG. 6, when the printed circuit board (PCB) 80 is formed and/or curved with the circular or oval shape, at least two side light sources 91a may be disposed on the outer surface of the printed circuit board (PCB) 80 with an interval that is constant or with various intervals changed according to the position.

As illustrated in (B) of FIG. 6, when the printed circuit board (PCB) 80 is formed and/or curved with the oval shape, the side light source 91a may be positioned outside a first surface having a large curvature radius rather than a second surface of a small curvature radius in one or more embodiments. In one or more embodiments, the interval between the side light sources 91a disposed according to the surface of the printed circuit board (PCB) 80 curved with the oval shape may be changed. For example, the interval between the side light source 91a positioned outside of the second surface (having the small curvature radius) may be smaller than the interval between the side light source 91a positioned outside of the first surface (having the large curvature radius).

As illustrated in (C) and (D) of FIG. 6, the printed circuit board (PCB) 80 may be formed and/or bent with a polygon shape. As illustrated in (C) of FIG. 6, when the printed circuit board (PCB) 80 is bent with a triangular shape, at least three side light sources 91a may be attached on the printed circuit board (PCB) 80; accordingly, a required or desirable beam spread angle of each side light source 91a may be more that about 120 degrees for substantially complete illumination. As illustrated in (D) of FIG. 6, when the printed circuit board (PCB) 80 is formed and/or bent with the hexahedral shape, at least six side light sources 91a may be necessary; accordingly, the required or desirable beam spread angle of the side light source 91a may be more than 60 degrees. In any case, the required or desirable beam spread angle of each side light source 91a included in one light source package 90 may be larger than a value found by dividing 360 degrees by the number of side light sources 91a.

As illustrated in (E) of FIG. 6, the printed circuit board (PCB) 80 may be formed and/or bent with an asymmetrical polygon shape.

As illustrated in (A) to (E) of FIG. 6, when the printed circuit board (PCB) 80 has a closed curved configuration, such as an oval or a polygon configuration, the side light source 91a attached to the printed circuit board (PCB) 80 may output the light in substantially all directions on a plane surface defined by the first direction D1 and the second direction D2 with respect to the corresponding light source package 90.

As illustrated in (F) of FIG. 6, the printed circuit board (PCB) 80 is not curved and may be extended in a straight line. In this case, the side light sources 91a may be disposed on the surface of one side of the printed circuit board (PCB) 80.

The arrangement, shape, and/or distribution of the side light sources 91a attached to the outer surface of the printed circuit board (PCB) 80 may be changed and/or optimized according to the beam spread angle of the side light sources 91a (a physical characteristic or limitation of the side light sources 91a) as well as the curved shape of the printed circuit board (PCB) 80. The beam spread angle means an angle in a range that is capable of obtaining luminance of more than half the highest luminance with reference to a position where the luminance of the light emitted from the light source is highest (referred to as a center axis of the beam spread angle). In general, in the case of the light emitting diode (LED) chip, the beam spread angle may be typically within about 120 degrees, but it is not limited thereto.

The shape of the printed circuit board (PCB) 80 also may be optimized based on characteristics of the side light sources 91a.

In one or more embodiments, the printed circuit board (PCB) 80 may be formed of a material having high thermal conductivity to effectively irradiate the heat emitted from the light sources 91a and 91b. For example, the printed circuit board (PCB) 80 may be made of a metal having high thermal conductivity such as aluminum (Al). In this case, the thickness of the printed circuit board (PCB) 80 may be in a range of about 100 μm to 300 μm, but it is not limited thereto.

Referring to FIG. 7, the side light sources 91a may be attached to the printed circuit board (PCB) 80 with one or more particular configurations relative to, for example, the first direction D1.

In one or more embodiments, referring to (A) of FIG. 7, one or more of the side light sources 91a may be attached such that the center axis Ax of the beam spread angle A1 is substantially aligned with or is parallel to the first direction D1.

In one or more embodiments, referring to (B) and (C) of FIG. 7, one or more of the side light source 91a may be attached such that the center axis Ax of the beam spread angle A1 is not substantially aligned with or parallel to the first direction D1.

In detail, as illustrated in (B) of FIG. 7, the side light source 91a may be attached such that the center axis Ax of the beam spread angle A1 is toward the lower side of the backlight unit 900 (illustrated in FIGS. 2 and 3) while forming the first angle t1 which is not 0 degree with the first direction D1. In this case, for the light emitted from the side light source 91a, the amount reflected from the reflecting surface R1 of a lower optical part 92a that will be described later is increased such that the light amount toward the upper portion where the diffusion sheet 73 is positioned may be large. The first angle t1 may be larger than 0 degrees and may be equal to or less than 10 degrees.

As illustrated in (C) of FIG. 7, the side light source 91a may be attached such that the center axis Ax of the beam spread angle A1 is toward the upper side of the backlight unit 900 (illustrated in FIGS. 2 and 3) while forming the second angle t2 which is not 0 degree with the first direction D1. In this case, the light emitted from the side light source 91a is reflected by the reflecting surface R2 of the upper optical part 92b that will be described after such that it may be directly incident to the diffusion sheet 73 or may be incident to the diffusion sheet 73 after reflection by the reflecting sheet 75. The second angle t2 may be larger than 0 degrees and may be equal to or less than 10 degrees.

As illustrated in FIG. 3, the upper light source 91b may emit the light to the upper portion of the backlight unit 900. Here, the upper portion may be a direction having a range of a predetermined angle with respect to the third direction D3. The predetermined angle may depend on one or more design factors such as the inclination angle of the reflecting sheet 75 (which affects the lamination provided by the side light sources 91a) and/or an area that the light emitted from the side light sources 91a reaches the diffusion sheet 73.

In an embodiment of the present invention, the direction of the center axis of the beam spread angle at which each of the side light sources 91a emits light is different from the direction of the center axis of the beam spread angle at which the upper light source 91b emits light. The upper light source 91b irradiates light to a region where the light emitted from the side light sources 91a do not sufficiently irradiate, for example, the region of a predetermined area facing the light source package 90. Advantageously, dark portion may be prevented, and substantially comprehensive illumination may be provided.

The upper light source 91b may also be attached to a printed circuit board (PCB) (not shown), thereby being mounted inside the light source package 90.

In one or more embodiments (as illustrated in FIG. 3, etc.), the light source package 90 may include one upper light source 91b. In one or more embodiments, the light source package 90 may include at least two upper light sources 91b for further enhancing illumination.

Referring to FIG. 3 to FIG. 5, the optical parts 92a and 92b may include a lower optical part 92a and an upper optical part 92b.

In one or more embodiments, the upper optical part 92b covers the upper light source 91b, and the light emitted from the upper light source 91b may be transmitted through and/or refracted by the upper optical part 92b. In further detail, the upper optical part 92b may include an optical lens that refracts the light emitted from the upper light source 91b for the light to be spread in a sufficiently wide range and to reach the diffusion sheet 73. That is, the upper optical part 92b may include an optical beam spread angle lens that may allow the light emitted from the upper light source 91b to reach the diffusion sheet 73 while enlarging the beam spread angle of the light. There may exist a groove 9 in a substantially central region of the outer surface of the upper optical part 92b. The groove 9 may have a concave shape, and the other region of the outer surface of the upper optical part 92b may be convex toward the upper side. The upper light source 91b may be mounted below and aligned with the groove 9. The distance from the inner surface to the outer surface of the upper optical part 92b just above the upper light source 91b may be shortest compared to other region.

An upper portion of the optical part 92b may include a curved surface of a convex lens that is convex toward the diffusion sheet 73. A lower side portion of the upper light source 91b may include a reflecting surface R2. The reflecting surface R2 may be a curved surface. The reflecting surface R2 may be convex toward the upper light source 92b and/or may be concave with respect to the reflecting sheet 75. The reflecting surface R2 of the upper optical part 92b may be configured to reflect the light emitted from the side light source 91a for the light to be directed toward the reflecting sheet 75.

As illustrated in FIG. 3 and FIG. 4, the upper optical part 92b may include an inner space that may contain the upper light source 91b.

The upper optical part 92b may be made of one or more of various transparent synthetic resins such as polycarbonate (PC), polystyrene (PS), and polymethyl methacrylate (PMMA). The reflecting surface R2 of the upper optical part 92b may be coated with a reflective material such as silver (Ag).

Referring to FIG. 3 to FIG. 5, the lower optical part 92a is positioned under the side light source 91a and includes the reflecting surface R1 for reflecting the light emitted from the side light source 91a. The reflecting surface R1 reflects the light emitted from the side light source 91a such that the reflected light may be directed toward the reflecting sheet 75. The reflecting surface R1 may be concave with respect to at least one of the diffusion sheet 73 and the reflecting sheet 75.

In one more embodiments (as illustrated in FIG. 3 and FIG. 4), the reflecting surface R2 of the upper optical part 92b and the reflecting surface R1 of the lower optical part 92a may be divided. In one or more embodiments, the reflecting surface R2 and the reflecting surface R1 may form one continuous curved surface or one reflective cup such that the light emitted to the side light source 91a may be transmitted sufficiently far according to the surface defined by the first direction D1 and the second direction D2. The light reflected from the reflecting surface R1 and the reflecting surface R2 is reflected from the reflecting sheet 75 to be directed toward the diffusion sheet 73.

The lower optical part 92a may include one or more of various transparent synthetic resins such as polycarbonate (PC), polystyrene (PS), or polymethyl methacrylate (PMMA), and/or may be made of one or more of various reflective materials such as aluminum (Al). If the lower optical part 92a is made of a transparent material, the reflecting surface R1 may be coated with a reflective material such as silver (Ag). If the lower optical part 92a is formed of a material that effectively radiates heat such as aluminum (Al), the heat radiated from the light source 91a and 91b may be effectively transmitted and discharged.

Referring to FIG. 8, the lower optical part 92a may be longer than the upper optical part 92b in the first direction D1 (with reference to the center of the light source package 90). That is, a length difference L1 in the first direction D1 by which the lower optical part 92a is longer than the upper optical part 92b may be larger than 0. With the combination of the relatively long upper optical part 92b and the reflecting sheet 75, the light emitted from the side light sources 91a may be emitted further in the side direction with respect to the light source package 90 for sufficiently illuminating the display panel 300. Advantageously, a display device having a large display area may be manufactured with minimum cost.

Referring to FIG. 9, in top views and/or in plan views of the light source package 90, the optical parts 92a and 92b according to one or more embodiments of the present invention may have one or more of various shapes according to one or more shapes of the printed circuit board (PCB) 80 illustrated in FIG. 6. That is, the optical parts 92a and 92b have the shapes such as circles ((A) of FIG. 9), ovals ((B) of FIG. 9), polygons ((C), (D), and (E) of FIG. 9, and/or a straight bars ((F) of FIG.

9). Particularly, (E) of FIG. 9 shows an example top view in which each of the optical parts 92a and 92b has an asymmetric polygon shape.

When the printed circuit board (PCB) 80 has a bar shape or a straight line shape as illustrated in (F) of FIG. 6, the shape of the optical parts 92a and 92b may also have bar shape or a straight line shape as illustrated in (F) of FIG. 9. In this case, a plurality of the upper light sources 91b and a plurality of the side light sources 91a may be disposed according to the direction that the optical parts 92a and 92b extend.

In one or more embodiments, the shapes of the optical parts 92a and 92b are not limited to the examples illustrated in FIG. 9. The shapes and dimensions of the optical parts 92a and 92b may be determined according to a length ratio of a longitudinal edge and a transverse edge of the display panel 300 and/or a display area that requires illumination.

The printed circuit board (PCB) 80 attached with the side light source 91a may be positioned between the lower optical part 92a and the upper optical part 92b. The lower optical part 92a and the upper optical part 92b may be divided (as illustrated in FIG. 4) or integrally formed.

Referring to FIG. 3, FIG. 4, and FIG. 5, the light source package 90 according to an embodiment of the present invention may further include a heat transfer pad transfer 93. The heat transfer pad 93 may transfer heat generated from the light sources 91a and 91b to surrounding air.

The heat transfer pad 93 may be made of a metal such as aluminum (Al) having heat conductivity for effective heat dissipation.

Referring to FIG. 3 and FIG. 5, the heat transfer pad 93 may include a first upper surface 93a thermally coupled with (and contacting) the lower optical part 92a, a side surface 93b thermally coupled with (and contacting) the printed circuit board (PCB) 80 attached with a plurality of side light sources 91a, and a second upper surface 93c thermally coupled with (and contacting) the upper light source 91b (illustrated in FIG. 3). The second upper surface 93c is positioned above the first upper surface 93a, and the side surface 93b is positioned between the first upper surface 93a and the second upper surface 93c.

In one or more embodiments, the portion of the heat transfer pad 93 positioned under the lower optical part 92a, that is, the portion including the first upper surface 93a, may be omitted. In this case, the lower optical part 92a may be directly mounted on (and contacting) the lower case 74.

Next, structural configuration of the light source package 90 in the backlight unit according to one or more embodiments of the present invention will be described with reference to FIG. 10.

Figure 10:
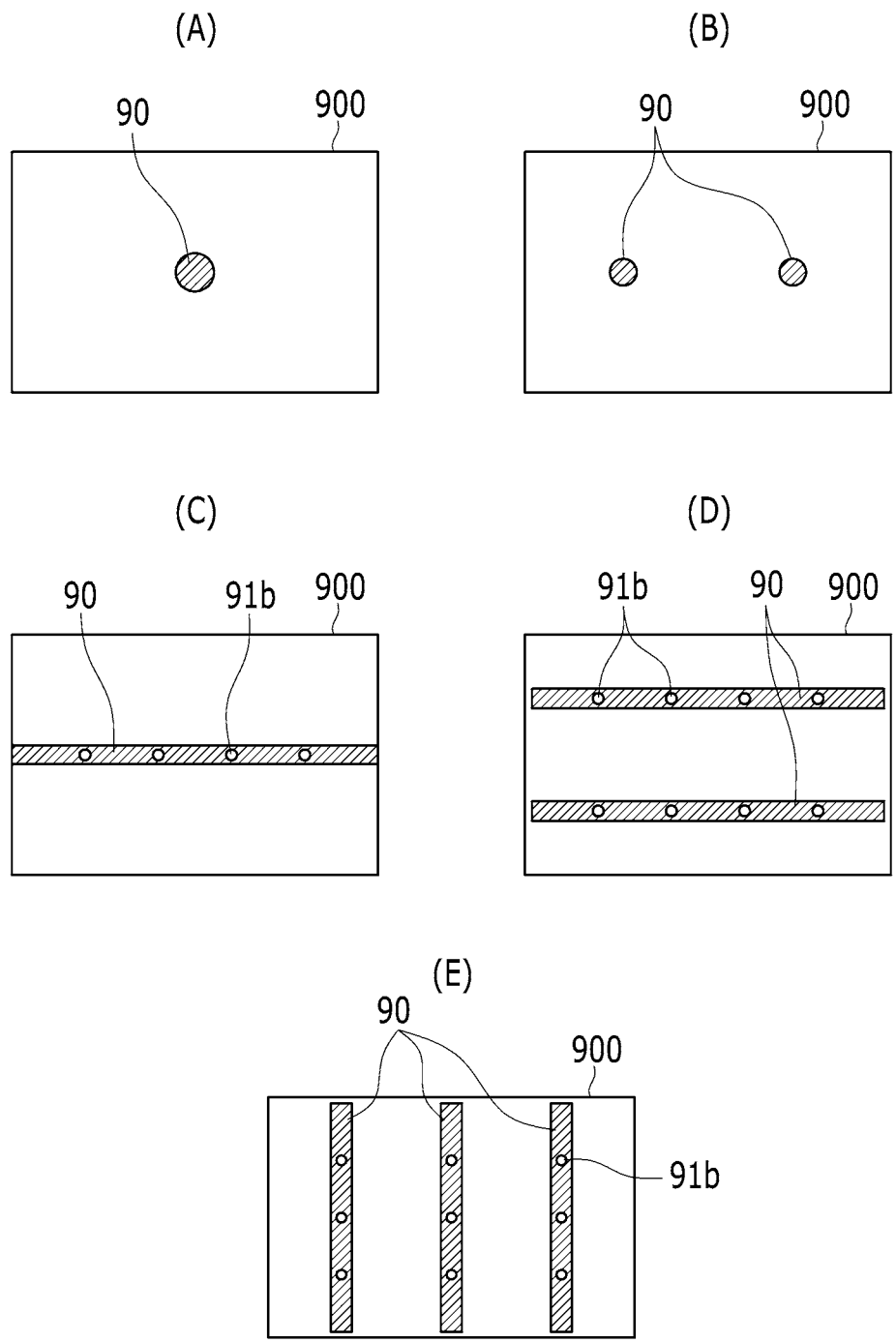
FIG. 10 illustrates top plan views of arrangement shapes of a light source package in a backlight unit according to one or more embodiments of the present invention.

FIG. 10 illustrates top plan views of the backlight unit 900 including the light source package 90 according to one or more embodiments of the present invention.

As illustrated in (A) of FIG. 10, the backlight unit 900 may include one light source package 90, and the light source package 90 may be positioned at the approximate center of the backlight unit 900. In this case, the light emitted from the light source package 90 may be uniformly incident to the entire surface of the diffusion sheet 73.

As illustrated in (B) of FIG. 10, the backlight unit 900 may include a plurality of light source packages 90. In one or more embodiments, the plurality of light source packages 90 may be uniformly distributed at the backlight unit 900, thereby uniformly providing the light to the lower surface of the diffusion sheet 73.

As illustrated in (C), (D), and (E) of FIG. 10, the light source package 90 may be formed as a bar type light source. In this case, the printed circuit board (PCB) 80 and the optical parts 92a and 92b included in the light source package 90 may be the bar type as illustrated in (F) of FIG. 6 and (F) of FIG. 9. In one or more embodiments, one light source package 90 may include a plurality of upper light sources 91b.

According to the embodiment illustrated in (C) of FIG. 10, the backlight unit 900 may include one bar type light source package 90, and the light source package 90 may be positioned at the approximate center region of the backlight unit 900. In this case, referring to FIG. 3 and referring to (B) and (C) of FIG. 7, a plurality of side light sources 91a may emit the light in one direction of upward or downward with reference to the position of the light source package 90.

As illustrated in (D) and (E) of FIG. 10, the backlight unit 900 may include a plurality of bar type light source packages 90. At this time, the light source packages 90 may be substantially uniformly distributed (with the same interval) in the backlight unit 900. In this case, referring to FIG. 3 and referring to (B) and (C) of FIG. 7, a plurality of side light sources 91a may emit the light in one direction of upward or downward with reference to the diffusion sheet 73 according to the position of the light source packages 90.

As illustrated in (D) of FIG. 10, the light source packages 90 may have a shape that is extended parallel to the relatively longer edge of the backlight unit 900. As illustrated in (E) of FIG. 10, the light source packages 90 may have a shape that is extended parallel to the relatively shorter edge of the backlight unit 900.

According to the several embodiments illustrated in FIG. 10, FIG. 1, and FIG. 3, the light emitted from each light source package 90 may be uniformly output in substantially comprehensive directions, to be directly or indirectly transmitted to the diffusion sheet 73 for comprehensively and uniformly illuminating the display panel 300.

Next, a circuit of the light source package according to one or more embodiments of the present invention will be described with reference to FIG. 11.

Figure 11:
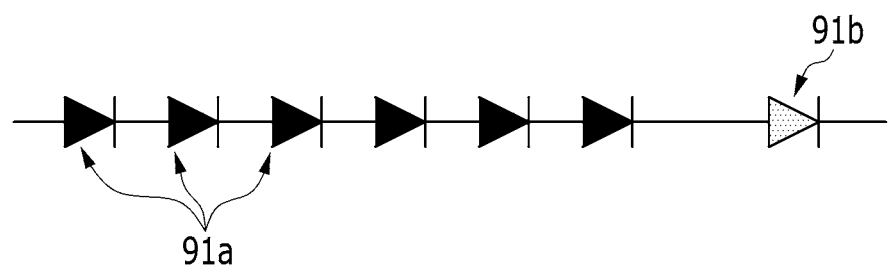
FIG. 11 illustrates circuit diagrams of light sources included in a light source package according to one or more embodiments of the present invention.
Figure 11:
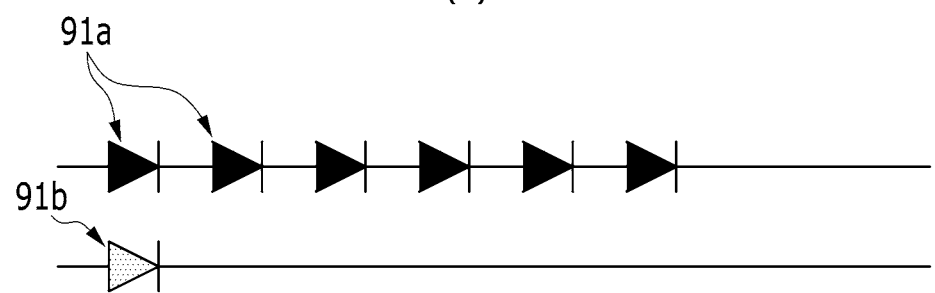

FIG. 11 illustrates circuit diagrams of light sources included in the light source package according to one or more embodiments of the present invention.

Referring to (A) of FIG. 11, the plurality of side light sources 91a included in the light source package 90 may be a plurality of light emitting diodes (LED) that are electrically coupled in series. In one or more embodiments, the upper light source 91b may be coupled in series at one side of the series of the side light source 91a. It is necessary for the upper light source 91b to emit light of sufficient luminance to prevent any dark portion in the upper region facing the light source package 90. A single driving voltage that enables the sufficient luminance may be input to the circuit including the side light sources 91a and the upper light source 91b. Accordingly, voltage supply and control for the light sources may be simplified.

Referring to (B) of FIG. 11, the plurality of side light sources 91a may be a plurality of light emitting diodes (LED) electrically coupled in series. The upper light source 91b may be implemented in a circuit that is separate from the circuit of the side light sources 91a and may be driven separately from the side light sources 91 a. In this case, the driving current to prevent the dark portion in the upper region facing the light source package 90 may be input to the upper light source 91b regardless of the driving current provided to the side light sources 91a. The upper light source 91b and the side light sources 91a may be separately controlled.

According to one or more embodiments of the present invention, the light source package 90 may include the side light source(s) 91a, the upper light source(s) 91b, and the optical parts 92a and 92b and may cooperate with the reflecting sheet 75 to substantially uniformly and comprehensively irradiate light to a required surface of the diffusion sheet 73 and/or the display panel 300. Given the structure of the optical parts (92a and 92b) and the reflecting sheet 75, compared with a conventional display device, a display device according to one or more embodiments of invention may require a lower number of light sources and/or a lower number of optical parts. Advantageously, the manufacturing cost of the backlight unit and/or the display device may be substantially minimized.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

| <Description of Symbols> | |
| --- | --- |
| 60: upper frame | 71: mold frame |
| 72: optical sheet | 73: diffusion sheet |
| 74: lower case | 75: reflecting sheet |
| 80: printed circuit board (PCB) | 90: light source package |
| 91a, 91b: light source | 92a, 92b: optical part |
| 300: display panel | 900: backlight unit |

What is claimed is:

1. A light source package comprising:

a first light source configured to emit first light, an imaginary central axis of the first light extending in a first direction;

a second light source configured to emit second light, an imaginary central axis of the second light extending in a second direction that is different from the first direction;

a first optical part including a first concave reflective surface that is configured to reflect at least a first portion of the first light; and a second optical part configured to spread the second light, the second optical part including a second concave reflective surface that is configured to reflect at least a second portion of the first light.

2. The light source package of claim 1, further comprising:

a reflecting sheet that reflects the first light reflected by the first concave reflective surface of the first optical part; and a diffusion sheet disposed over the first and second light sources, wherein the first light reflected by the reflecting sheet is directed toward the diffusion sheet, and the second light spread by the second optical part is directed toward the diffusion sheet.

3. The light source package of claim 1, wherein the second optical part overlaps the second light source.

4. The light source package of claim 3, wherein an outer surface of the second optical part includes a groove in a substantially central region of the outer surface, and the second light source is located below and aligned with the groove.

5. The light source package of claim 4, wherein a distance from an inner surface to the outer surface of the second optical part above the second light source is shortest.

6. The light source package of claim 1, wherein the first light source and the second light source are electrically connected in series.

7. The light source package of claim 1, wherein the first light source is positioned between the first optical part and the second optical part.

8. The light source package of claim 1, wherein the first concave reflective surface and the second concave reflective surface form one curved surface.

9. The light source package of claim 8, wherein the second concave reflective surface is convex toward the second light source.

10. The light source package of claim 8, wherein the first concave reflective surface extends longer than the second concave reflective surface.

11. The light source package of claim 1 further comprising a heat transfer unit thermally coupled with the first light source and surrounded by the first optical part.

12. The light source package of claim 1, wherein the first optical part is larger than the second optical part in a top view of the light source package.

13. The light source package of claim 1, wherein the first optical part includes at least one of a resin portion and a metal portion.

* * * * *